(12) United States Patent
Chauhan et al.

(10) Patent No.: US 11,422,718 B1
(45) Date of Patent: Aug. 23, 2022

(54) MULTI-PATH LAYER CONFIGURED TO PROVIDE ACCESS AUTHORIZATION FOR SOFTWARE CODE OF MULTI-PATH INPUT-OUTPUT DRIVERS

(71) Applicant: EMC IP Holding Company LLC, Hopkinton, MA (US)

(72) Inventors: Surendra Singh Chauhan, Ajmer (IN); Udit Tyagi, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 17/246,807

(22) Filed: May 3, 2021

(51) Int. Cl.
*G06F 3/06* (2006.01)

(52) U.S. Cl.
CPC .......... *G06F 3/0622* (2013.01); *G06F 3/067* (2013.01); *G06F 3/0613* (2013.01); *G06F 3/0635* (2013.01); *G06F 3/0644* (2013.01); *G06F 3/0659* (2013.01)

(58) Field of Classification Search
CPC .... G06F 3/0622; G06F 3/0613; G06F 3/0635; G06F 3/0644; G06F 3/0659; G06F 3/067
See application file for complete search history.

(56) References Cited

U.S. PATENT DOCUMENTS

| | | | |
|---|---|---|---|
| 6,567,397 B1 | 5/2003 | Campana et al. | |
| 6,687,746 B1 | 2/2004 | Shuster et al. | |
| 6,697,875 B1 | 2/2004 | Wilson | |
| 7,275,103 B1 | 9/2007 | Thrasher et al. | |
| 7,454,437 B1 | 11/2008 | Lavallee et al. | |
| 7,617,292 B2 | 11/2009 | Moore et al. | |

(Continued)

FOREIGN PATENT DOCUMENTS

CN 103677927 B 2/2017
EP 1117028 A2 7/2001
(Continued)

OTHER PUBLICATIONS

Kris Piepho, "Dell EMC SC Series Storage: Microsoft Multipath I/O," Dell EMC Best Practices, Jan. 2017, 57 pages.
(Continued)

*Primary Examiner* — Nicholas J Simonetti
(74) *Attorney, Agent, or Firm* — Ryan, Mason & Lewis, LLP

(57) ABSTRACT

An apparatus comprises a processing device configured to receive, from a given multi-path input-output driver of a given one of a plurality of host devices that utilizes a given piece of software for controlling delivery of input-output operations to a storage system over selected ones of a plurality of paths through a network, an access authorization check request for the given piece of software in response to expiration of a designated access authorization refresh interval, wherein authorization to access software code of the given piece of software is provided by an access authorization server external to the plurality of host devices. The processing device is also configured to determine an access authorization status of the given multi-path input-output driver. The processing device is further configured to provide, to the given multi-path input-output driver, an access authorization check response comprising the access authorization status of the given multi-path input-output driver.

20 Claims, 6 Drawing Sheets

(56) References Cited

U.S. PATENT DOCUMENTS

| | | | |
|---|---|---|---|
| 7,668,981 B1 | 2/2010 | Nagineni et al. | |
| 7,770,053 B1 | 8/2010 | Bappe et al. | |
| 7,809,912 B1 | 10/2010 | Raizen et al. | |
| 7,818,428 B1 | 10/2010 | Lavallee et al. | |
| 7,890,664 B1 | 2/2011 | Tao et al. | |
| 7,904,681 B1 | 3/2011 | Bappe et al. | |
| 7,925,872 B2 | 4/2011 | Lai et al. | |
| 8,250,256 B2 | 8/2012 | Ghosalkar et al. | |
| 8,285,825 B1 | 10/2012 | Nagaraj et al. | |
| 8,321,948 B2* | 11/2012 | Robinson | G06F 21/10 726/28 |
| 8,359,392 B2 | 1/2013 | Garbajs et al. | |
| 8,494,966 B2 | 7/2013 | Xu et al. | |
| 8,825,919 B1 | 9/2014 | Lim et al. | |
| 8,832,334 B2 | 9/2014 | Okita | |
| 8,874,746 B1 | 10/2014 | Gonzalez | |
| 8,984,220 B1* | 3/2015 | Gill | H04L 41/046 711/100 |
| 9,026,694 B1 | 5/2015 | Davidson et al. | |
| 9,201,803 B1 | 12/2015 | Derbeko et al. | |
| 9,400,611 B1 | 7/2016 | Raizen | |
| 9,430,368 B1 | 8/2016 | Derbeko et al. | |
| 9,594,780 B1 | 3/2017 | Esposito et al. | |
| 9,647,933 B1 | 5/2017 | Tawri et al. | |
| 9,672,160 B1 | 6/2017 | Derbeko et al. | |
| 9,778,852 B1 | 10/2017 | Marshak et al. | |
| 10,289,325 B1 | 5/2019 | Bono | |
| 10,353,714 B1 | 7/2019 | Gokam et al. | |
| 10,439,878 B1 | 10/2019 | Tah et al. | |
| 10,474,367 B1 | 11/2019 | Mallick et al. | |
| 10,476,960 B1 | 11/2019 | Rao et al. | |
| 10,521,369 B1 | 12/2019 | Mallick et al. | |
| 10,606,496 B1 | 3/2020 | Mallick et al. | |
| 10,637,917 B2 | 4/2020 | Mallick et al. | |
| 10,652,206 B1 | 5/2020 | Pusalkar et al. | |
| 10,754,572 B2 | 8/2020 | Kumar et al. | |
| 10,757,189 B2 | 8/2020 | Mallick et al. | |
| 10,764,371 B2 | 9/2020 | Rao et al. | |
| 10,789,006 B1 | 9/2020 | Gokam et al. | |
| 10,817,181 B2 | 10/2020 | Mallick et al. | |
| 10,838,648 B2 | 11/2020 | Sharma et al. | |
| 10,880,217 B2 | 12/2020 | Mallick et al. | |
| 10,884,935 B1 | 1/2021 | Doddaiah | |
| 10,911,402 B2 | 2/2021 | Pusalkar et al. | |
| 2002/0023151 A1 | 2/2002 | Iwatani | |
| 2002/0103923 A1 | 8/2002 | Cherian et al. | |
| 2004/0010563 A1 | 1/2004 | Forte et al. | |
| 2006/0026346 A1 | 2/2006 | Kadoiri et al. | |
| 2006/0277383 A1 | 12/2006 | Hayden et al. | |
| 2007/0174849 A1 | 7/2007 | Cheung et al. | |
| 2008/0043973 A1 | 2/2008 | Lai et al. | |
| 2008/0082976 A1 | 4/2008 | Steinwagner et al. | |
| 2008/0201458 A1 | 8/2008 | Salli | |
| 2008/0243699 A1 | 10/2008 | Hilerio et al. | |
| 2008/0301332 A1 | 12/2008 | Butler et al. | |
| 2009/0249329 A1 | 10/2009 | Dash | |
| 2009/0259749 A1 | 10/2009 | Barrett et al. | |
| 2009/0300641 A1 | 12/2009 | Friedman et al. | |
| 2009/0328225 A1 | 12/2009 | Chambers et al. | |
| 2010/0205303 A1 | 8/2010 | Chaturvedi et al. | |
| 2010/0293619 A1 | 11/2010 | Hayami | |
| 2010/0313063 A1 | 12/2010 | Venkataraja et al. | |
| 2011/0047624 A1 | 2/2011 | Vedantam et al. | |
| 2011/0197027 A1 | 8/2011 | Balasubramanian et al. | |
| 2011/0296230 A1 | 12/2011 | Chen et al. | |
| 2012/0102369 A1 | 4/2012 | Hiltunen et al. | |
| 2012/0246345 A1 | 9/2012 | Contreras et al. | |
| 2013/0117766 A1 | 5/2013 | Bax et al. | |
| 2013/0339551 A1 | 12/2013 | Flanagan et al. | |
| 2014/0105068 A1 | 4/2014 | Xu | |
| 2015/0222705 A1 | 8/2015 | Stephens | |
| 2015/0242134 A1 | 8/2015 | Takada et al. | |
| 2016/0092136 A1 | 3/2016 | Balakrishnan et al. | |
| 2016/0117113 A1 | 4/2016 | Li et al. | |
| 2016/0335003 A1 | 11/2016 | Ahmed et al. | |
| 2017/0235507 A1 | 8/2017 | Sinha et al. | |
| 2018/0189635 A1 | 7/2018 | Olarig et al. | |
| 2018/0253256 A1 | 9/2018 | Bharadwaj | |
| 2018/0317101 A1 | 11/2018 | Koue | |
| 2019/0095299 A1 | 3/2019 | Liu et al. | |
| 2019/0108888 A1 | 4/2019 | Sarkar et al. | |
| 2019/0334987 A1 | 10/2019 | Mallick et al. | |
| 2020/0021653 A1 | 1/2020 | Rao et al. | |
| 2020/0097203 A1 | 3/2020 | Mallick et al. | |
| 2020/0106698 A1 | 4/2020 | Rao et al. | |
| 2020/0110552 A1 | 4/2020 | Kumar et al. | |
| 2020/0112608 A1 | 4/2020 | Patel et al. | |
| 2020/0192588 A1 | 6/2020 | Kumar et al. | |
| 2020/0204475 A1 | 6/2020 | Mallick et al. | |
| 2020/0204495 A1 | 6/2020 | Mallick et al. | |
| 2020/0213274 A1 | 7/2020 | Pusalkar et al. | |
| 2020/0241890 A1 | 7/2020 | Mallick et al. | |
| 2020/0314218 A1 | 10/2020 | Kumar et al. | |
| 2020/0348860 A1 | 11/2020 | Mallick et al. | |
| 2020/0348861 A1 | 11/2020 | Marappan et al. | |
| 2020/0348869 A1 | 11/2020 | Gokam | |
| 2020/0349094 A1 | 11/2020 | Smith et al. | |
| 2020/0363985 A1 | 11/2020 | Gokam et al. | |
| 2020/0372401 A1 | 11/2020 | Mallick et al. | |
| 2021/0019054 A1 | 1/2021 | Anchi et al. | |
| 2021/0026551 A1 | 1/2021 | Tidke et al. | |
| 2021/0026650 A1 | 1/2021 | Rao et al. | |

FOREIGN PATENT DOCUMENTS

| | | | |
|---|---|---|---|
| EP | 2354995 A1 | 8/2011 | |
| EP | 2667569 A1 | 11/2013 | |
| WO | 2011037720 A1 | 3/2011 | |
| WO | PCT/US2019/052549 | 12/2019 | |
| WO | PCT/US2019/053204 | 12/2019 | |
| WO | PCT/US2019/053473 | 12/2019 | |
| WO | PCT/US2019/067144 | 5/2020 | |

OTHER PUBLICATIONS

NVM Express, "NVM Express, Revision 1.3," NVM Express, May 1, 2017, 282 pages.

VMware, "Multipathing Configuration for Software iSCSI Using Port Binding," Technical White Paper, Apr. 25, 2012, 15 pages.

Dell EMC, "Dell EMC SC Series Storage: Microsoft Multipath I/O," Dell EMC Engineering, Jun. 2017, 56 pages.

Dell EMC, "Dell EMC PowerPath Family: PowerPath and PowerPath/VE Multipathing," Data Sheet, 2017, 3 pages.

EMC, "EMC PowerPath and PowerPath/VE Family for Windows," Installation and Administration Guide, Oct. 2018, 102 pages.

EMC, "EMC Powerpath Load Balancing and Failover", Comparison with native MPIO operating system solutions, Feb. 2011, 28 pages.

Dell EMC, "PowerMax OS," Dell EMC PowerMax Family Product Guide, May 2019, 192 pages.

Dell EMC, "Dell EMC SC Series Storage and Microsoft Multipath I/O," CML 1004, Jul. 2018, 36 pages.

VMware, Inc. "VMware VMFS Volume Management," 2009, 8 pages.

Dell EMC, "Dell EMC Unity: Virtualization Integration," Technical White Paper, Oct. 2019, 39 pages.

Dell EMC, "Dell EMC PowerMax: iSCSI Implementation for Dell EMC Storage Arrays Running PowerMaxOS," Technical White Paper, Sep. 2019, 35 pages.

U.S. Appl. No. 16/697,393 filed in the name of Vinay G. Rao et al. filed Nov. 27, 2019, and entitled "Automated Seamless Migration of Logical Storage Devices."

U.S. Appl. No. 16/710,828 filed in the name of Amit Pundalik Anchi et al. filed Dec. 11, 2019, and entitled "Automated Seamless Migration with Signature Issue Resolution."

U.S. Appl. No. 16/711,742 filed in the name of Mahalakshmi Sokkalal et al. filed Dec. 12, 2019, and entitled "Proxy License Server for Host-Based Software Licensing."

* cited by examiner

US 11,422,718 B1

MULTI-PATH LAYER CONFIGURED TO PROVIDE ACCESS AUTHORIZATION FOR SOFTWARE CODE OF MULTI-PATH INPUT-OUTPUT DRIVERS

FIELD

The present invention relates generally to the field of information processing, and more particularly to storage in information processing systems.

BACKGROUND

Storage arrays and other types of storage systems are often shared by multiple host devices over a network. Applications running on the host devices each include one or more processes that perform the application functionality. The processes issue input-output (I/O) operations directed to particular logical storage volumes or other logical storage devices, for delivery by the host devices over selected paths to storage ports of the storage system. Different ones of the host devices can run different applications with varying workloads and associated IO patterns. Such host devices also generate additional IO operations in performing various data services such as migration and replication. Various types of storage access protocols can be used by host devices to access the logical storage volumes or other logical storage devices of the storage system, including by way of example Small Computer System Interface (SCSI) access protocols and Non-Volatile Memory Express (NVMe) access protocols.

SUMMARY

Illustrative embodiments of the present disclosure provide techniques for access authorization for software code of multi-path input-output drivers utilizing a multi-path layer of an information processing system.

In one embodiment, an apparatus comprises at least one processing device comprising a processor coupled to a memory. The at least one processing device is configured to perform the step of receiving, from a given multi-path input-output driver of a given one of a plurality of host devices that utilizes a given piece of software for controlling delivery of input-output operations to a storage system over selected ones of a plurality of paths through a network, an access authorization check request for the given piece of software in response to expiration of a designated access authorization refresh interval, wherein authorization to access software code of the given piece of software is provided by an access authorization server external to the plurality of host devices. The at least one processing device is also configured to perform the step of determining, in response to the access authorization check request, an access authorization status of the given multi-path input-output driver, the access authorization status indicating whether the given multi-path input-output driver has a given access authorization credential for the given piece of software checked-out from a pool of two or more access authorization credentials issued by the access authorization server for the plurality of host devices. The at least one processing device is further configured to perform the step of providing, to the given multi-path input-output driver, an access authorization check response comprising the access authorization status of the given multi-path input-output driver, the access authorization status specifying a remaining time on an access authorization linger period for the given access authorization credential.

These and other illustrative embodiments include, without limitation, methods, apparatus, networks, systems and processor-readable storage media.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
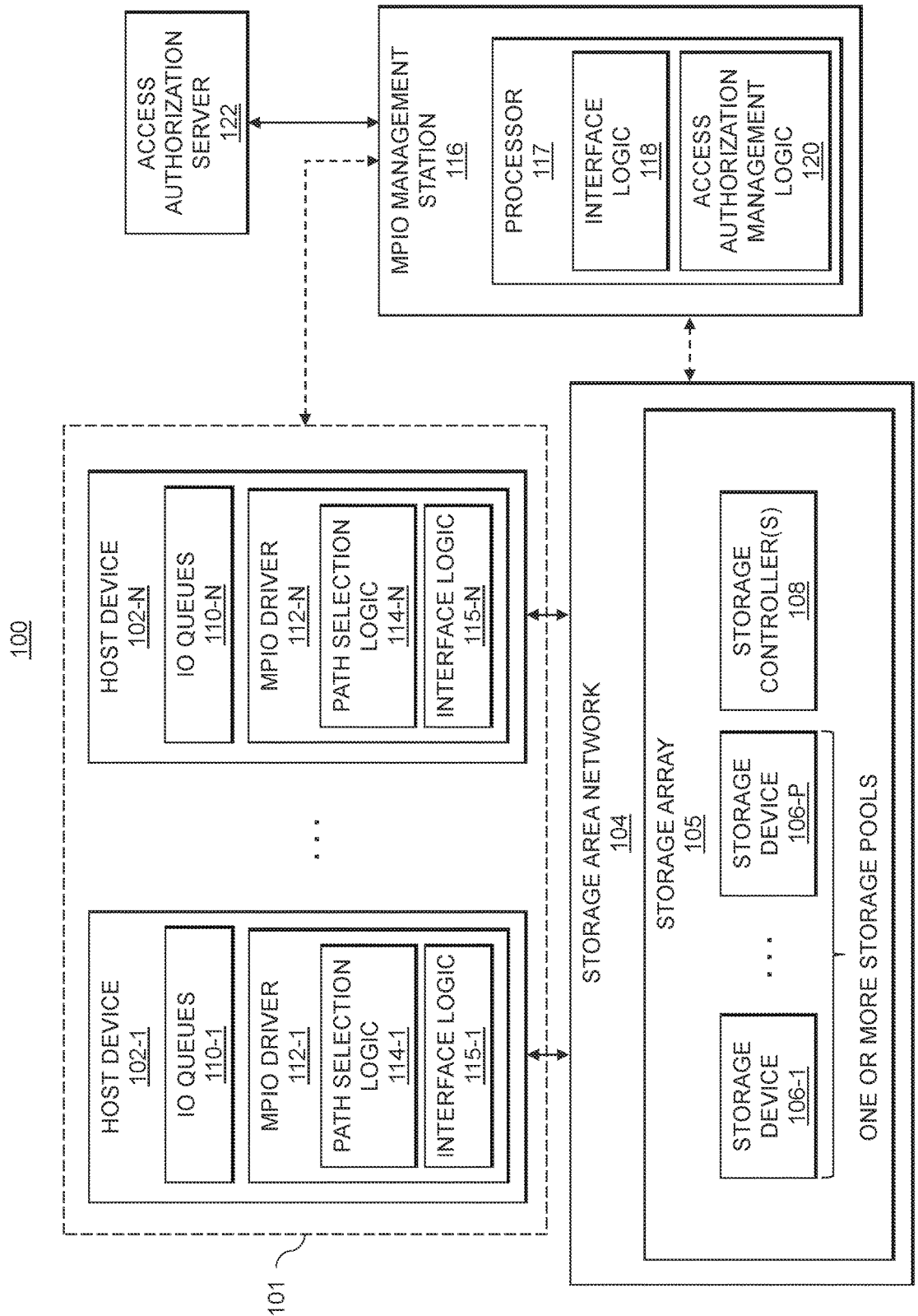
FIG. 1 is a block diagram of an information processing system configured for providing access authorization for software code for multi-path input-output drivers in an illustrative embodiment.

FIG. 1 shows an information processing system 100 configured in accordance with an illustrative embodiment. The information processing system 100 comprises a computer system 101 illustratively comprising a plurality of host devices 102-1, . . . 102-N (collectively, host devices 102), where N is an integer greater than or equal to two. The host devices 102 communicate over a storage area network (SAN) 104 with at least one storage array 105. The storage array 105 comprises a plurality of storage devices 106-1, . . . 106-P (collectively, storage devices 106) each storing data utilized by one or more applications running on one or more of the host devices 102, where P is also an integer greater than or equal to two. The storage devices 106 are illustratively arranged in one or more storage pools.

The storage array 105 and its associated storage devices 106 are an example of what is more generally referred to herein as a "storage system." This storage system in the present embodiment is shared by the host devices 102, and is therefore also referred to herein as a "shared storage system." Other embodiments can include only a single host device, possibly configured to have exclusive use of the storage system.

The host devices 102 illustratively comprise respective computers, servers or other types of processing devices capable of communicating with the storage array 105 of the SAN 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 106 of the storage array 105 of SAN 104 implement logical units (LUNs) configured to store objects for users associated with the host devices 102. These objects can comprise files, blocks or other types of objects. The host devices 102 interact with the storage array 105 utilizing read and write commands as well as other types of commands that are transmitted over the SAN 104. Such commands in some embodiments more particularly comprise Small Computer System Interface (SCSI) commands, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 105 to include different portions of one or more physical storage devices. Storage devices 106 may therefore be viewed as comprising respective LUNs or other logical storage volumes.

Each of the host devices 102 illustratively has multiple paths to the storage array 105, with at least one of the storage devices 106 of the storage array 105 being visible to that host device on a given one of the paths. A given one of the storage devices 106 may be accessible to the given host device over multiple paths.

Different ones of the storage devices 106 of the storage array 105 illustratively exhibit different latencies in processing of IO operations. In some cases, the same storage device may exhibit different latencies for different ones of multiple paths over which that storage device can be accessed from a given one of the host devices 102.

The host devices 102, SAN 104 and storage array 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage array 105 may be implemented on respective distinct processing platforms, although numerous other arrangements are possible. For example, in some embodiments at least portions of the host devices 102 and the storage array 105 are implemented on the same processing platform. The storage array 105 can therefore be implemented at least in part within at least one processing platform that implements at least a subset of the host devices 102.

The SAN 104 may be implemented using multiple networks of different types to interconnect storage system components. For example, the SAN 104 may comprise a portion of a global computer network such as the Internet, although other types of networks can be part of the SAN 104, including a wide area network (WAN), a local area network (LAN), a satellite network, a telephone or cable network, a cellular network, a wireless network such as a WiFi or WiMAX network, or various portions or combinations of these and other types of networks. The SAN 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The host devices 102 comprise respective sets of IO queues 110-1, . . . 110-N (collectively, IO queues 110) and respective MPIO drivers 112-1, . . . 112-N (collectively, MPIO drivers 112). The MPIO drivers 112 collectively comprise a multi-path layer of the host devices 102. Path selection functionality for delivery of IO operations from the host devices 102 to the storage array 105 is provided in the multi-path layer by respective instances of path selection logic 114-1, . . . 114-N (collectively, path selection logic 114) implemented within the MPIO drivers 112.

The MPIO drivers 112 may comprise, for example, otherwise conventional MPIO drivers, such as PowerPath® drivers from Dell EMC, suitably modified in the manner disclosed herein to provide functionality for dynamic control of one or more path selection algorithms. Other types of MPIO drivers from other driver vendors may be suitably modified to incorporate functionality for dynamic control of one or more path selection algorithms as disclosed herein.

The term "MPIO driver" as used herein is intended to be broadly construed, and such a component is illustratively implemented at least in part as a combination of software and hardware. For example, one or more of the MPIO drivers 112 can comprise one or more software programs running on a hardware processor of one or more of the host devices 102.

The host devices 102 can include additional or alternative components. For example, in some embodiments, the host devices 102 comprise respective local caches, implemented using respective memories of those host devices. A given such local cache can be implemented using one or more cache cards, possibly implementing caching techniques such as those disclosed in U.S. Pat. Nos. 9,201,803, 9,430,368 and 9,672,160, each entitled "System and Method for Caching Data," and incorporated by reference herein. A wide variety of different caching techniques can be used in other embodiments, as will be appreciated by those skilled in the art. Other examples of memories of the respective host devices 102 that may be utilized to provide local caches include one or more memory cards or other memory devices, such as, for example, an NVMe over PCIe cache card, a local flash drive or other type of NVM storage drive, or combinations of these and other host memory devices.

The system 100 further comprises an MPIO management station 116 that includes a processor 117 implementing interface logic 118 and access authorization management logic 120. The interface logic 118 is utilized to communicate with the host devices 102 and the storage array 105. For example the interface logic 118 may be utilized to communicate with corresponding interface logic 115-1, . . . 115-N (collectively, interface logic 115) implemented by the MPIO drivers 112 of the host devices 102. Such communication illustratively utilizes one or more representational state transfer (REST) application programming interfaces (APIs) of the MPIO drivers 112. Such an MPIO management station 116 provides management functionality for the multi-path layer comprising the MPIO drivers 112 of the host devices 102. In some embodiments, host device management software executing on the MPIO management station 116 interacts with storage array management software executing on the storage array 105. The MPIO management station 116, or portions thereof, may be considered in some embodiments as forming part of what is referred to herein as a "multi-path layer" that includes the MPIO drivers 112 of the host devices 102. The term "multi-path layer" as used herein is intended to be broadly construed and may comprise, for example, an MPIO layer or other multi-path software layer of a software stack, or more generally multi-pathing software program code, running on one or more processing devices each comprising at least one processor and at least one memory.

The MPIO management station 116 is an example of what is more generally referred to herein as an "external server" relative to the storage array 105. Additional or alternative external servers of different types can be used in other embodiments.

The MPIO driver 112-1 is configured to deliver IO operations selected from its corresponding set of IO queues 110-1 to the storage array 105 via selected ones of multiple paths over the SAN 104. The sources of the IO operations stored in the set of IO queues 110-1 illustratively include respective processes of one or more applications executing on the host device 102-1. For example, IO operations can be generated by each of multiple processes of a database application running on the host device 102-1. Such processes issue IO operations for delivery to the storage array 105 over the SAN 104. Other types of sources of IO operations may be present in a given implementation of system 100.

A given IO operation is therefore illustratively generated by a process of an application running on the host device 102-1, and is queued in a given one of the IO queues 110-1 of the host device 102-1 with other operations generated by other processes of that application, and possibly other processes of other applications.

The paths from the host device 102-1 to the storage array 105 illustratively comprise paths associated with respective initiator-target pairs, with each initiator comprising a host bus adaptor (HBA) or other initiating entity of the host device 102-1 and each target comprising a port or other targeted entity corresponding to one or more of the storage devices 106 of the storage array 105.

As noted above, the storage devices 106 illustratively comprise LUNs or other types of logical storage devices.

In some embodiments, the paths are associated with respective communication links between the host device 102-1 and the storage array 105 with each such communication link having a negotiated link speed. For example, in conjunction with registration of a given HBA to a switch of the SAN 104, the HBA and the switch may negotiate a link speed. The actual link speed that can be achieved in practice in some cases is less than the negotiated link speed, which is a theoretical maximum value. A negotiated link speed is an example of what is more generally referred to herein as a "negotiated rate."

The negotiated rates of the respective initiator and target of a particular one of the paths illustratively comprise respective negotiated data rates determined by execution of at least one link negotiation protocol for that path. The link negotiation protocol is illustratively performed separately by the initiator and the target, and involves each such component separately interacting with at least one switch of a switch fabric of the SAN 104 in order to determine the negotiated rate. The term "negotiated rate" therefore illustratively comprises a rate negotiated between an initiator or a target and a switch of a switch fabric of the SAN 104. However, the term "negotiated rate" as used herein is intended to be broadly construed so as to also encompass, for example, arrangements that refer to negotiated speeds. Any of a wide variety of different link negotiation protocols can be used, including auto-negotiation protocols, as will be readily appreciated by those skilled in the art.

For example, some embodiments are configured to utilize link negotiation protocols that allow negotiation of data rates such as 1G, 2G, 4G, 8G, 16G, 32G, etc., where G denotes Gigabits per second (Gb/sec). The link bandwidth is illustratively specified in terms of Megabytes per second (MB/sec), and the actual amount of data that can be sent over the link in practice is typically somewhat lower than the negotiated data rate. Accordingly, a negotiated rate of 1G in some systems may correspond to an actual achievable data rate that is lower than 100 MB/sec, such as a rate of 85 MB/sec.

The term "negotiated rate" as used herein is therefore intended to be broadly construed, so as to encompass, for example, a theoretical negotiated rate or an actual achievable data rate that corresponds to the theoretical negotiated rate within a given system.

It is also to be appreciated that a wide variety of other types of rate negotiation may be performed in other embodiments.

Various scheduling algorithms, load balancing algorithms and/or other types of algorithms can be utilized by the MPIO driver 112-1 in delivering IO operations from the IO queues 110-1 to the storage array 105 over particular paths via the SAN 104. Each such IO operation is assumed to comprise one or more commands for instructing the storage array 105 to perform particular types of storage-related functions such as reading data from or writing data to particular logical volumes of the storage array 105. Such commands are assumed to have various payload sizes associated therewith, and the payload associated with a given command is referred to herein as its "command payload."

A command directed by the host device 102-1 to the storage array 105 is considered an "outstanding" command until such time as its execution is completed in the viewpoint of the host device 102-1, at which time it is considered a "completed" command. The commands illustratively comprise respective SCSI commands, although other command formats can be used in other embodiments. A given such command is illustratively defined by a corresponding command descriptor block (CDB) or similar format construct. The given command can have multiple blocks of payload associated therewith, such as a particular number of 512-byte SCSI blocks or other types of blocks.

In illustrative embodiments to be described below, it is assumed without limitation that the initiators of a plurality of initiator-target pairs comprise respective HBAs of the host device 102-1 and that the targets of the plurality of initiator-target pairs comprise respective ports of the storage array 105.

Selecting a particular one of multiple available paths for delivery of a selected one of the 10 operations of the set of 10 queues 110-1 is more generally referred to herein as "path selection." Path selection as that term is broadly used herein can in some cases involve both selection of a particular 10 operation and selection of one of multiple possible paths for accessing a corresponding logical device of the storage array 105. The corresponding logical device illustratively comprises a LUN or other logical storage volume to which the particular 10 operation is directed.

It should be noted that paths may be added or deleted between the host devices 102 and the storage array 105 in the system 100. For example, the addition of one or more new paths from host device 102-1 to the storage array 105 or the deletion of one or more existing paths from the host device 102-1 to the storage array 105 may result from respective addition or deletion of at least a portion of the storage devices 106 of the storage array 105.

Addition or deletion of paths can also occur as a result of zoning and masking changes or other types of storage system reconfigurations performed by a storage administrator or other user. Some embodiments are configured to send a predetermined command from the host device 102-1 to the storage array 105, illustratively utilizing the MPIO driver 112-1, to determine if zoning and masking information has been changed. The predetermined command can comprise, for example, a log sense command, a mode sense command, a "vendor unique" or VU command, or combinations of multiple instances of these or other commands, in an otherwise standardized command format.

In some embodiments, paths are added or deleted in conjunction with addition of a new storage array or deletion of an existing storage array from a storage system that includes multiple storage arrays, possibly in conjunction with configuration of the storage system for at least one of a migration operation and a replication operation.

For example, a storage system may include first and second storage arrays, with data being migrated from the first storage array to the second storage array prior to removing the first storage array from the storage system.

As another example, a storage system may include a production storage array and a recovery storage array, with data being replicated from the production storage array to the recovery storage array so as to be available for data recovery in the event of a failure involving the production storage array.

In these and other situations, path discovery scans may be repeated as needed in order to discover the addition of new paths or the deletion of existing paths.

A given path discovery scan can be performed utilizing known functionality of conventional MPIO drivers, such as PowerPath® drivers.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the storage array 105 as well to discover the disappearance of any existing LUNs that have been deleted from the storage array 105.

The MPIO driver 112-1 in some embodiments comprises a user-space portion and a kernel-space portion. The kernel-space portion of the MPIO driver 112-1 may be configured to detect one or more path changes of the type mentioned above, and to instruct the user-space portion of the MPIO driver 112-1 to run a path discovery scan responsive to the detected path changes. Other divisions of functionality between the user-space portion and the kernel-space portion of the MPIO driver 112-1 are possible. The user-space portion of the MPIO driver 112-1 is illustratively associated with an Operating System (OS) kernel of the host device 102-1. Other MPIO driver arrangements are possible. For example, in some embodiments, an MPIO driver may be configured using a kernel-based implementation, and in such an arrangement may include only a kernel-space portion and no user-space portion.

For each of one or more new paths identified in the path discovery scan, the host device 102-1 may be configured to execute a host registration operation for that path. The host registration operation for a given new path illustratively provides notification to the storage array 105 that the host device 102-1 has discovered the new path.

The MPIO driver 112-1 is further configured to determine IO processing performance for each of at least a subset of the paths, and to dynamically adjust a path selection algorithm, utilized by the path selection logic 114-1 in selecting particular ones of the paths for delivery of the IO operations from the host device 102-1 to the storage array 105, based at least in part on the determined performance.

In determining IO processing performance of respective paths, the MPIO driver 112-1 obtains information such as, for example, response times or other latency measures of the respective paths. This information is illustratively referred to in the context of some embodiments herein as "path condition information," although other types of information can be used in other embodiments. Dynamic control of one or more path selection algorithms is therefore performed in some embodiments using latency measures.

The above-noted process of determining IO processing performance for each of at least a subset of the paths and dynamically adjusting a path selection algorithm utilized in selecting particular ones of the paths for delivery of the IO operations from the host device to the storage array 105 based at least in part on the determined performance are illustratively repeated in each of a plurality of intervals. The particular duration of such time periods can be a user-configurable parameter, or set by default, and can vary depending upon factors such as the desired resolution of the IO processing performance information and the amount of overhead required to determine that information.

In the FIG. 1 embodiment, the storage array 105 comprises one or more storage controllers 108. The storage controllers 108 may maintain per-port IO processing information. Such per-port IO processing information is illustratively collected by the storage array 105, and in some embodiments may be provided to one or more of the host devices 102 for use in conjunction with path selection.

The MPIO management station 116 is arranged as an intermediary device relative to the host devices 102 and the storage array 105. Some communications between the host devices 102 and the storage array 105 can occur via such an intermediary device, which as indicated elsewhere herein can alternatively comprise one or more external servers. Such communications illustratively involve utilization of an out-of-band communication mechanism, such as one or more IP connections between the host devices 102 and the MPIO management station 116.

As indicated previously, the host devices 102 communicate directly with the storage array 105 using one or more storage access protocols such as SCSI, Internet SCSI (iSCSI), SCSI over FC (SCSI-FC), NVMe over FC (NVMe/FC), NVMe over Fabrics (NVMeF), NVMe over TCP (NVMe/TCP), and/or others. The MPIO management station 116 in some embodiments is similarly configured to communicate directly with the storage array 105 using one or more such storage access protocols.

The MPIO driver 112-1 on the host device 102-1 illustratively has connectivity to the MPIO management station 116. The MPIO management station 116 in some embodiments implements PowerPath® Management Appliance (PPMA) functionality to obtain access to the storage array 105. The MPIO driver 112-1 can obtain from the MPIO management station 116 certain types of storage array related information for use in various operations performed at least in part by the MPIO driver 112-1, in addition to or in place of obtaining such information directly from the storage array 105. Host multi-pathing software can be used to implement a multi-path layer comprising MPIO drivers 112 of respective host devices 102 as well as related management appliance software such as the above-noted PPMA of MPIO management station 116. Such host multi-pathing software can be configured to facilitate logical storage device access as disclosed herein.

It should be noted that various logic components (e.g., path selection logic 114, interface logic 115, interface logic 118, access authorization management logic 120, etc.) disclosed herein can include various combinations of hardware, firmware and software. The term "logic" as used herein is therefore intended to be broadly construed.

As indicated above, at least portions of the communications between the host devices 102 and the storage array 105 can utilize an in-band communication mechanism in which one or more predetermined commands in a designated storage access protocol are sent from the host device 102-1 to the storage array 105. Such predetermined commands can comprise, for example, read and/or write commands, sense commands (e.g., log sense and/or mode sense commands), "vendor unique" or VU commands, or combinations of multiple instances of these or other commands, in an otherwise standardized command format, such as a SCSI format, an NVMe format, or other type of format. A "command" as the term is broadly used herein can comprise a combination of multiple distinct commands.

It is also possible for the host devices 102 and the storage array 105 to communicate via one or more out-of-band communication mechanisms. For example, an out-of-band communication mechanism of this type can involve host management software of the host device 102-1 communicating with storage array management software of the storage array 105 over an IP network connection or other type of network connection. Such host management software can include software running on the MPIO management station 116, in addition to or in place of software running on the individual host devices 102.

Additional components not explicitly shown in the figure, such as one or more storage caches, may also be provided in the storage array 105 for use in processing 10 operations. For example, in some embodiments, each of the storage controllers 108 has a different local cache or a different allocated portion of a global cache associated therewith, although numerous alternative arrangements are possible. The storage controllers 108 can be implemented as respective storage processors, directors or other storage system components configured to control storage system operations relating to processing of 10 operations.

It is assumed that each of the other MPIO drivers 112 is configured in a manner similar to that described above and elsewhere herein for the first MPIO driver 112-1. The other host devices 102 of the system 100 are therefore also configured to communicate over the SAN 104 with the storage array 105. The MPIO drivers 112 of such other host devices are each similarly configured to deliver 10 operations from its corresponding one of the sets of 10 queues 110 to the storage array 105 over selected paths through the SAN 104.

Accordingly, functionality described above in the context of the first MPIO driver 112-1 and the first host device 102-1 is assumed to be similarly performed by each of the other MPIO drivers 112 and/or more generally by their respective host devices 102.

The MPIO drivers 112 may be otherwise configured utilizing well-known multi-pathing functionality. Such conventional multi-pathing functionality is suitably modified in illustrative embodiments disclosed herein to support access authorization for at least a portion of software code of the MPIO driver 112.

Although in some embodiments certain commands used by the host devices 102 to communicate with the storage array 105 illustratively comprise SCSI commands, other types of commands and command formats can be used in other embodiments. For example, some embodiments can implement 10 operations utilizing command features and functionality associated with NVMe, as described in the NVMe Specification, Revision 1.3, May 2017, which is incorporated by reference herein. Other NVMe storage access protocols of this type that may be utilized in illustrative embodiments disclosed herein include NVMe/FC, NVMeF and NVMe/TCP.

The storage array 105 in the present embodiment is assumed to comprise a persistent memory that is implemented using a flash memory or other type of non-volatile memory of the storage array 105. More particular examples include NAND-based flash memory or other types of non-volatile memory such as resistive RAM, phase change memory, spin torque transfer magneto-resistive RAM (STT-MRAM) and Intel Optane™ devices based on 3D XPoint™ memory. The persistent memory is further assumed to be separate from the storage devices 106 of the storage array 105, although in other embodiments the persistent memory may be implemented as a designated portion or portions of one or more of the storage devices 106. For example, in some embodiments the storage devices 106 may comprise flash-based storage devices, as in embodiments involving all-flash storage arrays, or may be implemented in whole or in part using other types of non-volatile memory.

The storage array 105 in the present embodiment may comprise additional components not explicitly shown in the figure, such as a response time control module and 10 operation priority queues, illustratively configured to make use of the above-described persistent memory. For example, the response time control module may be used to implement storage array based adjustments in response time for particular IO operations based at least in part on service level objective (SLO) information stored by the storage array 105 in its persistent memory. The response time control module is assumed to operate in conjunction with the above-noted IO operation priority queues.

The storage array 105 illustratively utilizes its IO operation priority queues to provide different levels of performance for IO operations. For example, the IO operation priority queues may have respective different priority levels. The storage array 105 may be configured to provide different priority levels for different ones of the IO operations by assigning different ones of the IO operations to different ones of the IO operation priority queues. The IO operation priority queues are illustratively associated with respective SLOs for processing of IO operations in the storage array 105. Process tags may be used in assigning different ones of the IO operations to different ones of the IO operation priority queues, as disclosed in U.S. Pat. No. 10,474,367, entitled "Storage System with Input-Output Performance Control Utilizing Application Process Detection," which is incorporated by reference herein.

As mentioned above, communications between the host devices 102 and the storage array 105 may utilize PCIe connections or other types of connections implemented over one or more networks. For example, illustrative embodiments can use interfaces such as Internet SCSI (iSCSI), Serial Attached SCSI (SAS) and Serial ATA (SATA). Numerous other interfaces and associated communication protocols can be used in other embodiments.

The storage array 105 in some embodiments may be implemented as part of cloud infrastructure in the form of a cloud-based system.

The storage devices 106 of the storage array 105 can be implemented using solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 106.

The storage array 105 may additionally or alternatively be configured to implement multiple distinct storage tiers of a multi-tier storage system. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

As another example, the storage array 105 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array. For example, the storage array 105 may comprise one or more storage arrays such as one or more Unity™ or PowerMax™ storage arrays, commercially available from Dell Technologies.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

In some embodiments, a storage system comprises first and second storage arrays arranged in an active-active configuration. For example, such an arrangement can be used to ensure that data stored in one of the storage arrays is replicated to the other one of the storage arrays utilizing a synchronous replication process. Such data replication across the multiple storage arrays can be used to facilitate failure recovery in the system 100. One of the storage arrays may therefore operate as a production storage array relative to the other storage array which operates as a backup or recovery storage array.

It is to be appreciated, however, that embodiments disclosed herein are not limited to active-active configurations or any other particular storage system arrangements. Accordingly, illustrative embodiments herein can be configured using a wide variety of other arrangements, including, by way of example, active-passive arrangements, active-active Asymmetric Logical Unit Access (ALUA) arrangements, and other types of ALUA arrangements.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage array 105.

Numerous other distributed implementations of the host devices 102 and/or the storage array 105 are possible. Accordingly, the storage array 105 can also be implemented in a distributed manner across multiple data centers.

Additional examples of processing platforms utilized to implement portions of the system 100 in illustrative embodiments will be described in more detail below in conjunction with FIGS. 5 and 6.

Access authorization for software code of MPIO drivers 112 can be a challenging task. Such access authorization may include, for example product licensing for software products such as the MPIO driver 112 or features thereof (e.g., path selection logic 114). For example, standalone software running on the host devices 102 for implementing the path selection logic 114 may rely on access authorization keys or credentials (e.g., license keys), issued by an access authorization server 122 (e.g., an electronic license management server (ELMS) or other type of license server), that are stored or saved in the host devices 102. Such an access authorization approach, however, can be compromised through reverse engineering the access authorization model utilized by the access authorization server 122 (e.g., an electronic licensing model used by an ELMS). An access authorization model, such as an electronic licensing model, may be used to restrict a particular access authorization credential (e.g., a license) to a specific one of the host devices 102, to specific software on one of the host devices 102 (e.g., to software for implementing path selection logic 114), to specific features of software on one of the host devices 102, etc. In some access authorization models, the access authorization server 122 may generate host access authorization credentials (e.g., host licenses) based on unique identifiers of the host devices 102. The unique identifier of a given one of the host devices 102 may, in some cases, be based on hardware or other characteristics of that host device. Thus, each time one of the host devices 102 is re-imaged, the host access authorization credential for that host device must be re-generated. Also, in such an access authorization model the same host access authorization credential cannot be shared across multiple ones of the host devices 102 or across platforms, as the host access authorization credentials are assumed to be tied to the unique identifiers of the host devices 102. Further, upgrades of the access authorization server 122 in such an access authorization model may cause disruption to the host devices 102 (e.g., to access authorization or licensing modules resident thereon that support such an access authorization or licensing model). When the host devices 102 are production hosts that deploy and host live functionality, such disruption can significantly affect performance.

Various types of access authorization models may be used, including various types of electronic licensing models. The "served" license model is an application-based license model which is defined according to the license server that manages the allocation of licenses. The served license model is dependent on the availability of the license server, and if the license server goes down the license will be released to a license pool. The "unserved" license model is a host-based license model, in which the physical address or other characteristics of host devices are used to generate host-specific licenses prior to use. In a "classic" license model, features of software or another type of product are encrypted and the license is stored as license keys in host devices. The license key can be used for multiple installations of the software or other product. The drawback of such licensing models is that, when licensing enhancement is done, licensing modules resident in host devices have to be updated along with the software or other product in the host devices. This causes significant disruption, particularly where the host devices are production hosts. Another drawback of such licensing models is that licenses cannot generally be shared across different ones of the host devices and across different platforms used by different ones of the host devices. Further, such licensing models are deficient in that license renewal may not be regularly enforced thus allowing license tampering. Generally, upgrade of a licensing server causes disruption to licensing modules running in production hosts.

In various conventional electronic licensing models or other types of access authorization models, license keys or other access authorization credentials are stored inside production hosts. Such models, however, are exploitable through license or access authorization credential leakage. After a "linger" period, a license or other access authorization server (e.g., access authorization server 122) releases a license or other access authorization credential assigned to a host, even though that license or other access authorization credential may still be in use until the host is rebooted. Further, conventional licensing or other types of access authorization models require tight coupling, requiring an active communication link between the license or other access authorization server and the hosts. If communication is lost or disrupted between the license or other access authorization server and a host (e.g., after license or other access authorization credential acquisition by the host), then the license or other access authorization credential will be released.

The MPIO management station 116, as noted above, implements access authorization management logic 120 that is configured to manage access authorization for the MPIO drivers 112 of the host devices 102. The host devices 102 are assumed to comprise production hosts in a data center or other enterprise system, with associated MPIO drivers 112 hosting live functionality (e.g., of path selection logic 114). The host devices 102 are thus also referred to herein as production hosts 102. The access authorization management logic 120 may also be referred to herein as an access authorization or license supervisor, or as an access authorization proxy sever or proxy license server.

The access authorization management logic 120 implemented by the MPIO management station 116 runs between the access authorization server 122 and software (e.g., MPIO drivers 112) in the production hosts 102, to coordinate access authorization (e.g., licenses) for software code used across the production hosts 102. Therefore, the access authorization management logic 120 runs on an external server (e.g., the MPIO management station 116) different than the production hosts 102. The access authorization management logic 120 may be with the needed number of purchased licenses or other access authorization credentials, and renews licenses or other access authorization credentials for the production hosts 102 in regular intervals.

The access authorization management logic 120 utilizes the interface logic 118 to communicate with the production hosts 102 (e.g., via the interface logic 115 of the production hosts 102). The interface logic 118 may also be referred to herein as a management interface 118, with the instances of interface logic 115 of the production hosts 102 being referred to as host interfaces 115. Illustratively, the management interface 118 and the host interfaces 115 comprise REST or other types of APIs of host-based software running on the MPIO management station 116 and the production hosts 102. The host-based software running on the production hosts 102 may be the MPIO drivers 112. The access authorization management logic 120 utilizes the management interface 118 to communicate with the host interfaces 115 of the production hosts 102 on a fixed interval. This advantageously overcomes the challenge of lost connections through socket or other means. This also prevents tight coupling between the production hosts 102 and the access authorization server 122, as in illustrative embodiments the production hosts 102 do not require active communication with the access authorization server 122 (or the access authorization management logic 120 of the MPIO management station 116) all the time.

The MPIO management station 116 utilizes the access authorization management logic 120 to perform grant and release of licenses or other access authorization credentials to respective ones of the production hosts 102. The access authorization management logic 120 may perform pool-based licensing or access authorization for the production hosts 102 in a data center or other enterprise system as a whole, rather than relying on host-specific licensing or access authorization (e.g., where host licenses or other access authorization credentials are tied to unique identifiers of the production hosts 102). The access authorization management logic 120 of the MPIO management station 116 is configured to manage licenses or other access authorization credentials for the production hosts 102 devices in the data center or other enterprise system using a license or other access authorization credential pool and a license or other access authorization database. Through communication utilizing the management interface 118 and the host interfaces 115, licenses or other access authorization credentials may be checked out from the license or other access authorization credential pool. Licenses or other access authorization credentials are checked back in to the license or other access authorization credential pool at the end of the license or other access authorization credential checkout period. This advantageously avoids license key or other access authorization credential loss in the event that one of the production hosts 102 crashes. Standalone software on the production hosts 102 (e.g., such as the MPIO drivers 112) can preserve licenses (e.g., license keys) or other access authorization credentials in process memory or a kernel, whichever is feasible or desired for a particular implementation. In this way, the license keys or other access authorization credentials cannot be hacked by end-users of the production hosts 102.

Use of the access authorization management logic 120 on the MPIO management station 116 provides a number of advantageous features. For example, the MPIO management station 116 can handle license or other access authorization credential leakage. A regular license or other access authorization credential renewal period may be set (e.g., once a week, once a month, etc.). Regular license or other access authorization credential renewal may be initiated by the production hosts 102 using the host interfaces 115 to invoke or utilize REST API calls to the management interface 118 of the MPIO management station 116. This avoids license or other access authorization credential leakage, corruption and duplication. Further, as noted above, the MPIO management station 116 utilizes the access authorization management logic 120 to perform pool-based licensing or other access authorization for an entire data center including the production hosts 102, instead of relying on host-specific licensing or access authorization. The MPIO management station 116 via the access authorization management logic 120 can manage licenses or other access authorization credentials for the production hosts 102 using its own license or other access authorization credential pool and license or other access authorization credential database. Thus, the MPIO management station 116 takes care of internal license key or other access authorization credential management for the production hosts 102. The MPIO management station 116 further enables a loosely coupled licensing architecture. The MPIO management station 116, by acting intermediately between the access authorization server 122 and the production hosts 102, alleviates the need of a licensing or other access authorization agent or module in the production hosts 102. This allows the access authorization server 122 and the MPIO management station 116 to upgrade independently of the production hosts 102.

The MPIO management station 116 may store various information relating to available licenses or other access authorization credentials, license or other access authorization status of the production hosts 102, etc. in a host database (e.g., host database 210 shown in FIG. 2, described in further detail below). Such a host database may be implemented internal to the MPIO management station 116, or may be implemented at least partially external to the MPIO management station 116. The host database 210 may be any type of database or other data store configured to store such information.

Although not explicitly shown in FIG. 1, one or more input-output devices such as keyboards, displays or other types of input-output devices may be used to support one or more user interfaces to the MPIO management station 116 (e.g., to the management interface 118 thereof, which may provide a graphical user interface (GUI), etc.), as well as to support communication between the MPIO management station 116 and other related systems and devices not explicitly shown.

The production hosts 102, as noted above, implement host interfaces 115. The host interfaces 115 are configured, in some embodiments, to persist license or other access authorization credential information provided by the access authorization management logic 120 of the MPIO management station 116. The host interfaces 115 may persist such license or other access authorization credential information in a kernel space or process memory (e.g., to avoid user accessibility and thus avoid license or other access authorization credential leakage) of the MPIO drivers 112 of the production hosts 102. When software on the production hosts 102 is being utilized, such software may access the kernel space or process memory to determine whether the production hosts 102 have been licensed or otherwise have access authorization from the MPIO management station 116 to use such software. In some embodiments, the MPIO management station 116 sets a license or other access authorization status in the kernel space or process memory as a Boolean (e.g., 1 if a given production host 102 is licensed or authorized, 0 otherwise) along with other license or other access authorization credential information such as license or other access authorization credential expiry, issue date, renewal date, etc. If a given one of the production hosts 102 determines that particular software is not licensed or authorized, that software may have its features restricted (e.g., a basic version of the software may be used, with some functionality locked or not enabled). The host interfaces 115 may also be configured to renew licenses or other access authorization credentials with the MPIO management station 116 (e.g., at regular intervals, on-demand or user request, etc.).

The access authorization management logic 120 is implemented by the MPIO management station 116, which is assumed to comprise a different physical or virtual computing device than the production hosts 102. The MPIO management station 116 and the access authorization management logic 120 runs between the access authorization server 122 and software (e.g., path selection logic 114) in the MPIO drivers 112 of the production hosts 102 to coordinate software or other product licensing or other access authorization across the production hosts 102 in the data center or other enterprise system.

The MPIO management station 116 is loaded or provisioned (e.g., by the access authorization server 122) with a number of licenses or other access authorization credentials for a particular piece of software (e.g., the path selection logic 114 running on the MPIO drivers 112 of the production hosts 102), and connects to the production hosts 102 for licensing or other access authorization using the management interface 118 and host interfaces 115. The host licenses or other access authorization credentials of the production hosts 102 are renewed at regular intervals, such as on expiration of a designated time period from a time at which the host licenses or other access authorization credentials were most recently renewed (e.g., one day, one week, one month, etc.), at a designated time interval (e.g., at noon every day, every Monday, the first day of each month, etc.) regardless of when the host licenses or other access authorization credentials were most recently renewed, etc. Renewal of the host licenses or other access authorization credentials may also be performed on-demand such as via user requests submitted to the management interface 118 of the MPIO management station 116. This model for host and software independent licensing or other access authorization enables licensing or other access authorization of any software or other product used by the MPIO drivers 112 of the production hosts 102 (e.g., not just the path selection logic 114), and more generally may be used to license or other manage access authorization for other software or products such as the MPIO drivers 112 themselves, or additional software or other products of the production hosts 102.

The access authorization server 122 is assumed to issue a pool of licenses or other access authorization credentials (e.g., x licenses or other access authorization credentials) to the MPIO management station 116 for use by the production hosts 102 in a particular data center or other enterprise system. The MPIO management station 116, via the access authorization management logic 120, is configured to provision the x licenses or other access authorization credentials to any x of the production hosts 102 as needed.

Advantageously, use of the access authorization management logic 120 of the MPIO management station 116 avoids the need for re-generating licenses or other access authorization credentials related to host re-imaging. The licenses or other access authorization credentials can be shared across the production hosts 102 (e.g., which may utilize different platforms such as different operating systems (OSes), different hardware, different products, etc.). Further, the production hosts 102 do not need to implement licensing or other access authorization modules that communicate with the access authorization server 122 (or any other entity outside an associated data center or other enterprise system) in order to utilize the MPIO drivers 112 and software or other products thereof such as the path selection logic 114. Thus, the production hosts 102 can function and work independently of licensing or other access authorization upgrades, in contrast with conventional techniques where such a licensing or other access authorization module is required. Further, there is no need for a public network connection between the MPIO management station 116 and the production hosts 102. Instead, the management interface 118 and host interfaces 115 may utilize a REST API over a private network connection internal to the data center or other enterprise system in which the production hosts 102 run.

In some embodiments, the MPIO management station 116 (implementing the access authorization management logic 120) and the production hosts 102 (comprising the MPIO drivers 112) are on a "private" network of the data center or other enterprise system (e.g., that is not accessible by the access authorization server 122). The private network may be used to secure communications when the MPIO drivers 112 of the production hosts 102 and the access authorization management logic 120 implemented by the MPIO management station 116 initiate connections (e.g., using the management interface 118 and host interfaces 115) to perform licensing or other access authorization tasks such as renewing licenses or other access authorization credentials or communicating license or other access authorization status of the MPIO drivers 112 of the production hosts 102. It should be appreciated, however, that such a private network connection is not a requirement. In some cases, given the potentially large scale of production hosts 102 with MPIO drivers 112 having licenses or other access authorization credentials managed by the access authorization management logic 120 implemented by the MPIO management station 116, the costs of allocating a private network strictly for the purposes of such communication is prohibitive. Thus, an operator of the data center in which the production hosts 102 and MPIO management station 116 operate may desire an alternative for establishing trust between the production hosts 102 and MPIO management station 116 (e.g., between the MPIO drivers 112 and the access authorization management logic 120), such as by leveraging a secure protocol.

In some embodiments, the production hosts 102 and MPIO management station 116 share or utilize REST APIs for licensing or other access authorization tasks performed by the access authorization management logic 120. The access authorization management logic 120 is implemented on the MPIO management station 116 that resides in the same private network as the production hosts 102 that it manages.

It is to be appreciated that these and other features of illustrative embodiments are presented by way of example only, and should not be construed as limiting in any way. Accordingly, different numbers, types and arrangements of system components such as access authorization server 122, host devices 102, SAN 104, storage array 105, storage devices 106, sets of IO queues 110, MPIO drivers 112 (including their corresponding instances of path selection logic 114 and interface logic 115), MPIO management station 116, processor 117, interface logic 118 and access authorization management logic 120, can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

Figure 2:
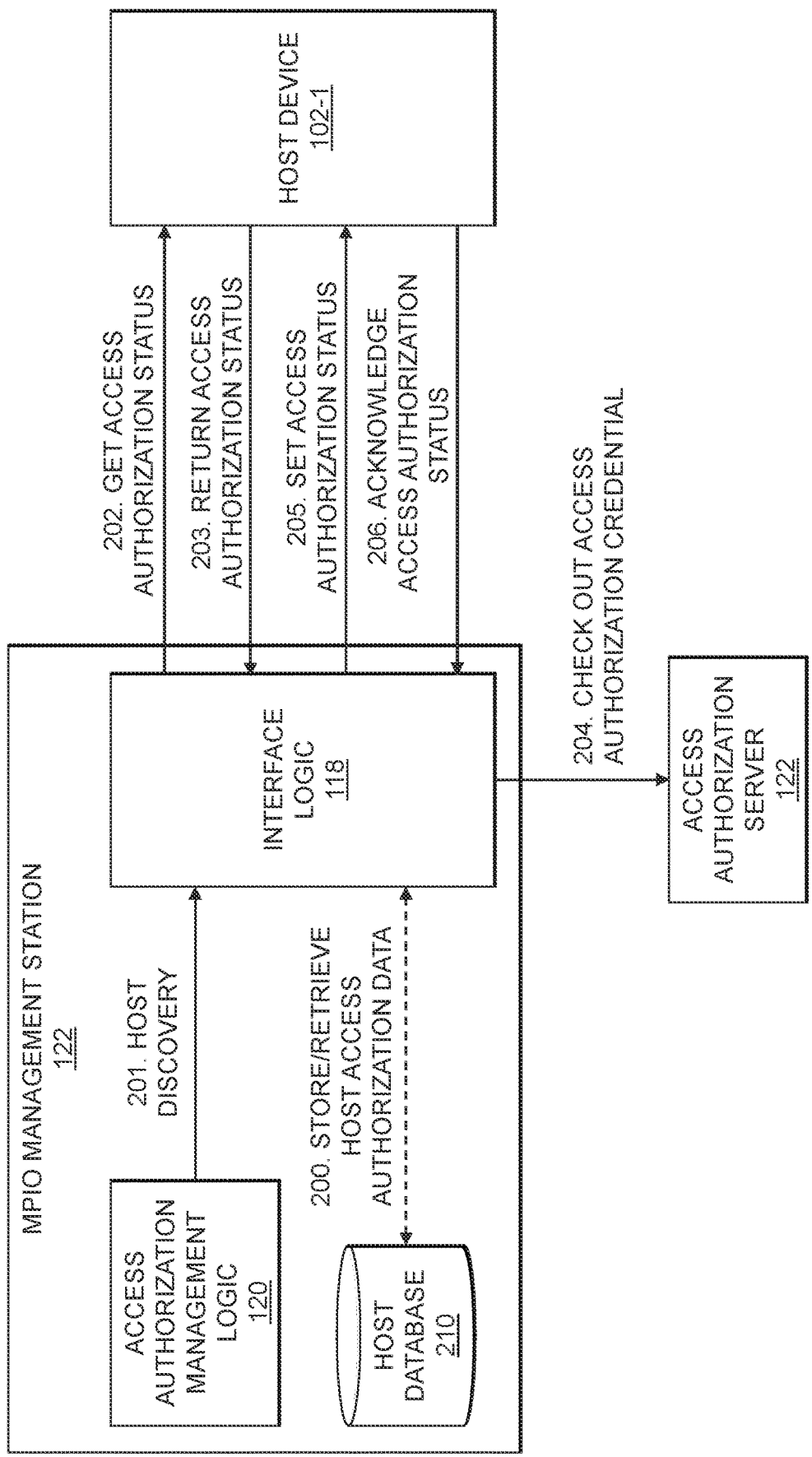
FIG. 2 is a system flow illustrating a process for performing access authorization for software code of multi-path input-output drivers in the FIG. 1 information processing system in an illustrative embodiment.

FIG. 2 illustrates a system flow in the information processing system 100 for provisioning a host license or other access authorization credential in a given one of the production hosts 102-1. For clarity of illustration, certain elements of the FIG. 1 system are omitted in FIG. 2. The system flow begins in step 201, where the access authorization management logic 120 initiates host discovery of available production hosts 102 in a data center or other enterprise system (e.g., that implement MPIO drivers 112 with licensing or other access authorization managed by the MPIO management station 116) utilizing the management interface

118. In step 202, on discovering the production host 102-1, the access authorization management logic 120 of the MPIO management station 116 utilizes the management interface 118 to get the license or other access authorization status of the MPIO driver 112-1 (or particular software or products thereof, such as path selection logic 114-1) utilizing the host interface 115-1 implemented by the MPIO driver 112-1 of the production host 102-1. The production host interface 115-1 implemented by the MPIO driver 112-1 of the production host 102-1 returns the license or other access authorization status in step 203.

If the production host 102-1 is in an unlicensed or unauthorized state, the access authorization management logic 120 of the MPIO management station 116 checks out a license or other access authorization credential, if available, from a license or other access authorization credential pool issued by the access authorization server 122 to the MPIO management station 116 in step 204. In some embodiments, this includes the MPIO management station 116 communicating with the access authorization server 122 (e.g., to check out a license or other access authorization credential, to update a license or other access authorization credential database maintained by the access authorization server 122, etc.). In step 205, the access authorization management logic 120 of the MPIO management station 116, via the management interface 118, then sets the license or other access authorization status of the MPIO driver 112-1 (or particular software thereof such as path selection logic 114-1) of the production host 102-1 to a licensed or authorized state. In response, the host interface 115-1 will license or authorize the MPIO driver 112-1 (or particular software thereof such as path selection logic 114-1) of the production host 102-1. This may involve storing a license or other access authorization credential key or other information in a process or kernel memory of the production host 102-1. The host interface 115-1 implemented by the MPIO driver 112-1 of the production host 102-1 then returns an acknowledgement of the license or other access authorization status to the access authorization management logic 120 of the MPIO management station 116, via the management interface 118, in step 206.

The production host interface 115-1 implemented by the MPIO driver 112-1 of the production host 102-1 (as well as other ones of the production host interfaces 115 implemented by other ones of the MPIO drivers 112 of other ones of the production hosts 102) communicate with the access authorization management logic 120 implemented by the MPIO management station 116, via the management interface 118, at regular intervals to renew licenses or other access authorization credentials. If a particular production host such as production host 102-1 is unable to connect to or otherwise communicate with the MPIO management station 116 to renew the license or other access authorization credential as scheduled, there may be a grace period where the associated MPIO driver 112-1 of the production host 102-1 is still permitted to use the software or other product being licensed until the production host 102-1 is able to connect to the MPIO management station 116 to renew the license or other access authorization credential, or until the grace period expires.

FIG. 2 further shows an optional step 200, where the access authorization management logic 120 of the MPIO management station 116, via the management interface 118, stores and/or retrieves host license or other access authorization credential data from a host database 210. For example, step 200 may be performed by the access authorization management logic 120 to determine which production hosts 102 in the data center or other enterprise system have MPIO drivers or other software that are currently licensed or otherwise have authorized access via a license or other access authorization credential from a pool of available licenses or other access authorization credentials issued by the access authorization server 122 to the MPIO management station 116 for use by the production hosts 102 in the data center or other enterprise system. This may be performed prior to step 201, such that the access authorization management logic 120 utilizes the management interface 118 to discover the particular production hosts 102 in the data center or other enterprise system with MPIO drivers whose licenses or other access authorization credentials should be renewed. Step 200 may further or alternatively be performed before, during or after one or more of steps 201 through 206. For example, after receiving the license or other access authorization status in step 203 or in conjunction with checking out the license or other access authorization credential in step 204 or setting the license or other access authorization status in step 205, the access authorization management logic 120 of the MPIO management station 116 may update host licensing or other access authorization information in the host database 210. As another example, the access authorization management logic 120 of the MPIO management station 116 may update host licensing or other access authorization information in the host database 210 after receiving the acknowledgement in step 206.

The access authorization management logic 120 implemented by the MPIO management station 116 can advantageously be used for managing licensing or other access authorization in situations where a particular piece of software or other product is to be installed on multiple different ones of the MPIO drivers 112 of the production hosts 102 in a data center or other enterprise system. It should be appreciated that the MPIO management station 116 and access authorization management logic 120 may be configured to manage licensing or other access authorization for multiple different pieces of software or other products that are used on or by the MPIO drivers 112 of the production hosts 102, including the MPIO drivers 112 themselves and possibly other software or products external to the MPIO drivers 112 on the production hosts 102. The access authorization server 122 may issue multiple pools of licenses or other access authorization credentials for multiple different pieces of software or other products to the MPIO management station 116, multiple access authorization servers may each issue one or more pools of licenses or other access authorization credentials for one or more different pieces of software or other products to the MPIO management station 116, etc. Further, the MPIO management station 116 and access authorization management logic 120 may be configured to manage licensing or other access authorization for two or more different pieces of software or other products on two or more distinct subsets of the production hosts 102.

Although shown as internal to the MPIO management station 116 in FIG. 2, the host database 210 may be implemented at least in part external to the MPIO management station 116 in some embodiments.

As discussed above, in some embodiments a license or other access authorization check request is initiated as part of a license or other access authorization refresh on some specified interval (e.g., once a week, once a month, etc.). In some embodiments, license or other access authorization check requests are initiated by the production hosts 102 (e.g., on expiry of the specified interval). In other embodiments, the MPIO management station 116 may initiate a license or other access authorization check request for one or more production hosts 102. In response to a license or other access authorization check request for a given production host (e.g., production host 102-1), the MPIO management station 116 queries host license or other access authorization credential usage (e.g., such as from a license or other access authorization credential database such as the host database 210 which may be implemented internal or external to the MPIO management station 116, from the access authorization server 122 which may comprise an ELMS that utilizes Flex libraries, etc.) to determine whether the production host 102-1 is licensed or otherwise authorized to access software code of one or more software products (e.g., MPIO drivers 112, features thereof such as path selection logic 114, etc.).

If the production host 102-1 is licensed or otherwise authorized to access the software code of the one or more software products (e.g., as determined from the returned license or other access authorization status in step 203 of the FIG. 2 flow), the MPIO management station 116 will refresh the license or other access authorization credential linger period of the production host for a designated time interval. The license or other access authorization credential linger period may be different than the license or other access authorization credential refresh interval. For example, the license or other access authorization credential refresh interval may be 7 days, while the license or other access authorization credential linger period may be refreshed for 21 days, to reduce the overhead of refreshing the license or other access authorization credential every 7 days or connection or disconnection of a host. The access authorization management logic 120 of the MPIO management station 116 may keep a counter after registering or refreshing a license or other access authorization credential as a checkout date, and compares it with the current date. In case it exceeds 13 days of the checkout period, the access authorization management logic 120 of the MPIO management station 116 refreshes the license or other access authorization credential linger period (e.g., in a license or other access authorization credential database maintained by the MPIO management station 116, by the access authorization server 122, combinations thereof, etc.), and sends license or other access authorization details to the production host 102-1 as well.

If the production host 102-1 is not licensed or authorized to access the software code of one or more software products (e.g., as determined from the returned license or other access authorization credential status in step 203 of the FIG. 2 flow), the access authorization management logic 120 of the MPIO management station 116 proceeds with the FIG. 2 license registration flow. The access authorization management logic 120, via the management interface 118, responds to the production host 102-1 in step 205 with a license or other access authorization payload and a license or other access authorization status (e.g., whether the production host 102-1 is licensed or authorized to access the software code of the one or more software products). The access authorization management logic 120 responds back with a license or other access authorization status as true if the production host 102-1 is licensed or otherwise authorized to access the software code of the one or more software products, along with a payload of refreshed license or other access authorization details, such as that shown below:

<lic_payload>
  <target_host_lic_expiry>12-Jun-2021</target_host_lic_expiry>
  <target_host_lic_grace_period>21-Jun-2021</target_host_lic_grace_period>
  <target_host_lic_exp_days>77</target_host_lic_exp_days>
  <target_host_lic_issue_date>10-Jun-2021</target_host_lic_issue_date>
  <target_host_lic_start_date>10-Jun-2021</target_host_lic_start_date>
  <target_host_lic_end_date>12-Jun-2021</target_host_lic_end_date>
  <target_host_lic_type>SUBSCRIPTION</target_host_lic_type>
  <target_host_lic_feat_version>5.4</target_host_lic_feat_version>
  <mhd_ip>12.34.56.789</mhd_ip>
</lic_payload>

In the example above, the license or other access authorization payload (e.g., <lic_payload>) includes a target host license or other access authorization credential expiration date (e.g., <target_host_lic_expiry>) of Jun. 12, 2021, a target host license or other access authorization credential grace period (e.g., <target_host_lic_grace_period>) of Jun. 21, 2021, a target host license or other access authorization credential expiration (e.g., <target_host_lic_exp_days>) of 77 days, a target host license or other access authorization credential issue date (e.g., <target_host_lic_issue_date>) of Jun. 10, 2021, a target host license or other access authorization credential start date (e.g., <target_host_lic_start_date>) of Jun. 10, 2021, a target host license or other access authorization credential end date (e.g., <target_host_lic_end_date>) of Jun. 12, 2021, a target host license or other access authorization credential type (e.g., <target_host_lic_type>) of "subscription," a target host license or other access authorization credential feature version (e.g., <target_host_lic_feat_version>), and an IP address of the MPIO management station 116 running the access authorization management logic 120 (e.g., <mhd_ip>) of "12.34.56.789." In some embodiments, as noted above, the MPIO management station 116 may comprise or run a PPMA and thus <mhd_ip>is a PPMA IP address.

The access authorization management logic 120 responds back with a license or other access authorization status as true if the production host 102-1 is not currently licensed or otherwise authorized to access the software code of the one or more software products, but where a license or other access authorization credential is checked out (e.g., from a pool of licenses or other access authorization credentials that are issued by the access authorization server 122 to the MPIO management station 116 for the production hosts 102). The license or other access authorization payload in such an example will include details similar to that described above. The access authorization management logic 120 responds back with a license or other access authorization status as false if the production host 102-1 is unlicensed or not authorized to access the software code of the one or more software products and there are no free licenses or other access authorization credentials available to be checked out from the pool of licenses or other access authorization credentials that are issued by the access authorization server 122 to the MPIO management station 116 for the production hosts 102. Thus, the model addresses both use cases and the host will be made unlicensed accordingly.

Figure 3:
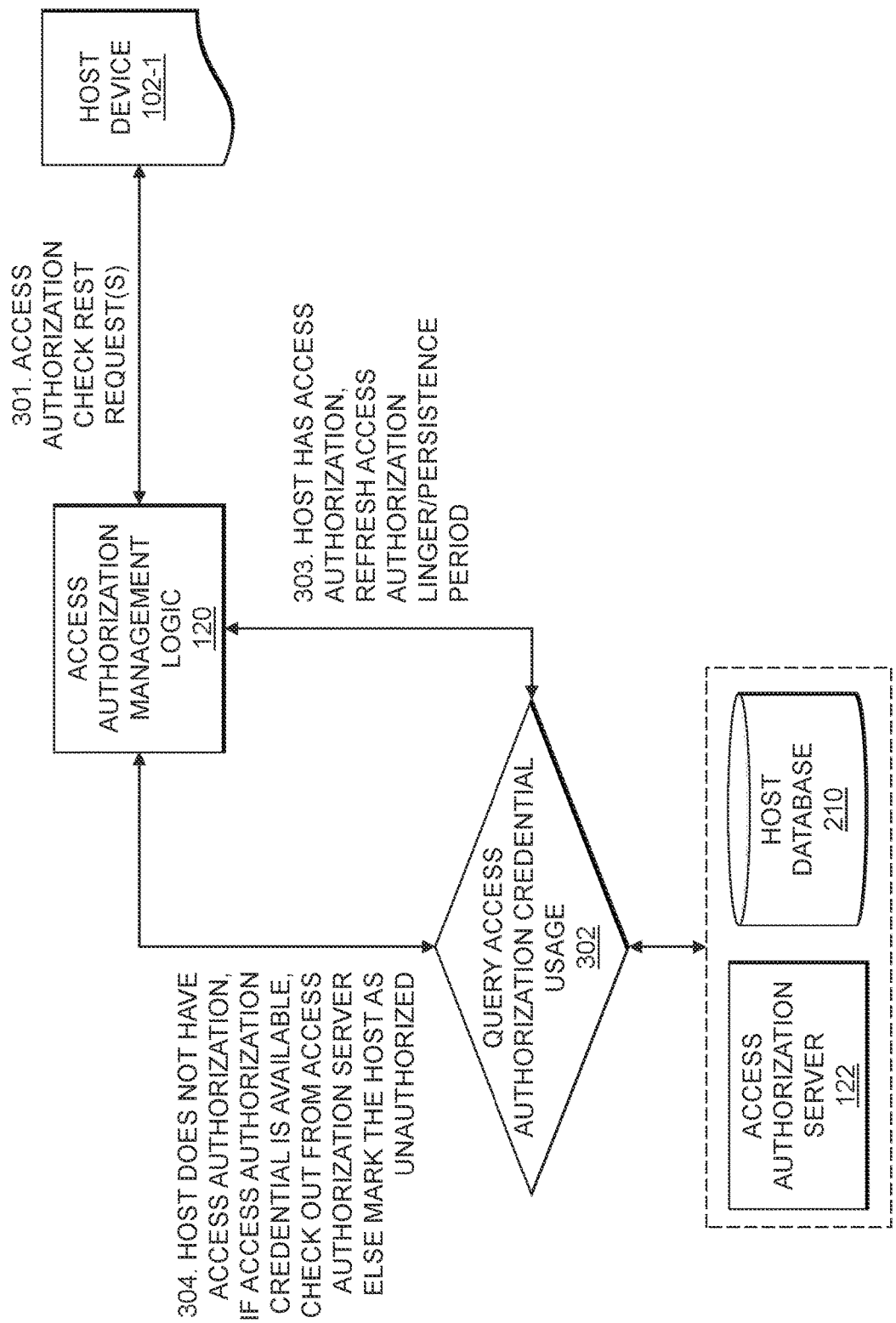
FIG. 3 is a flow diagram of an exemplary process for performing access authorization for software code of multi-path input-output drivers in an illustrative embodiment.

FIG. 3 illustrates such a licensing or other access authorization model, with a production host 102-1 that sends license or other access authorization check requests to the access authorization management logic 120 in step 301. The access authorization management logic 120 in step 302 queries license or other access authorization credential usage from one or both of the access authorization server 122 and the host database 210. In step 303, if the production host 102-1 is licensed or otherwise authorized to access the software code of the one or more software products, the license or other access authorization credential linger or persistence period is refreshed by the access authorization management logic 120. In step 304, if the host is un-licensed or otherwise not authorized to access the software code of the one or more software programs and if a license or other access authorization credential is available to be checked out, then the production host 102-1 is licensed with an ELMS-served license or otherwise authorized to access the software code of the one or more software products (e.g., utilizing an access authorization credential). Otherwise, the production host 102-1 is marked as unlicensed or unauthorized.

Advantageously, the access authorization management logic 120 of the MPIO management station 116 enables a REST API-based solution that overcomes the need for active host-license server (or, more generally, host to access authorization server) communication challenges. Further, there is no need for a public network connection between the MPIO management station 116 and the production hosts 102. A private network connection is sufficient to provide communication between the MPIO management station 116 and the production hosts 102 (e.g., using a REST or other API supported by the management interface 118 and the host interfaces 115). Further, the production hosts 102 do not need to implement licensing or other access authorization modules, and thus the production hosts 102 can work independently of licensing or other access authorization upgrades. This is in contrast with conventional approaches, where a licensing or other access authorization module is required to be present in each individual server or production host. Further, conventional approaches typically persist an encrypted license key or other access authorization credential in standalone hosts, where that encrypted license key or other access authorization credential can be copied to multiple hosts leading to license or other access authorization credential leakage. Conventional approaches are also typically based on socket communication, which is inconsistent and can also lead to license or other access authorization credential leakage. The access authorization management logic 120 of the MPIO management station 116 also avoids the need to re-generate licenses or other access authorization credentials related to or in response to re-imaging of the production hosts 102. Licenses or other access authorization credentials can also be shared across the production hosts 102, platforms, and products. Regular license or other access authorization renewal keeps licenses or other access authorization credentials safe and free from tampering.

Figure 4:
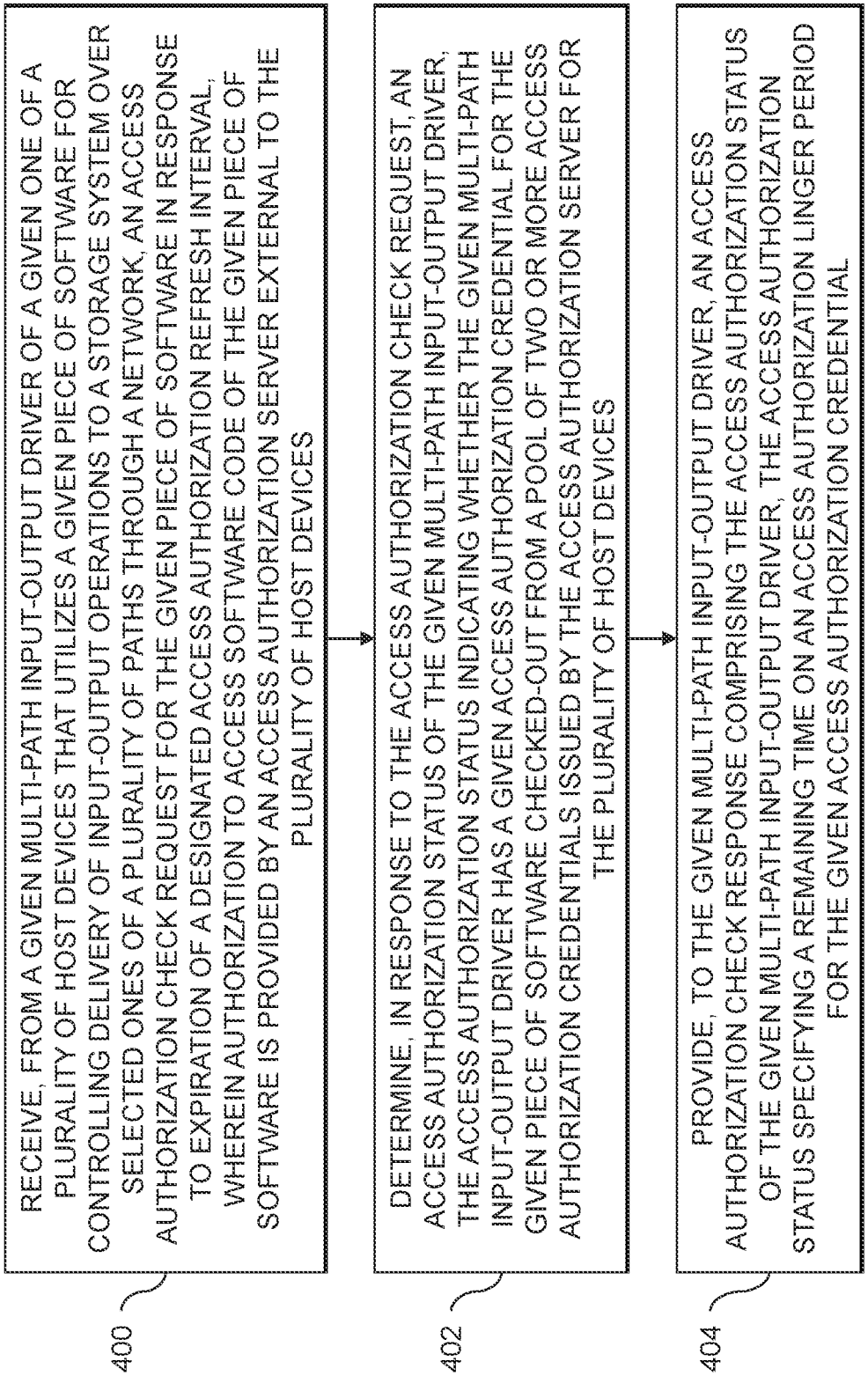
FIG. 4 is a flow diagram of an exemplary process for performing access authorization for software code of multi-path input-output drivers in an illustrative embodiment.

An exemplary process for access authorization for software code of multi-path input-output drivers will now be described in more detail with reference to the flow diagram of FIG. 4. It is to be understood that this particular process is only an example, and that additional or alternative processes for access authorization for software code of multi-path input-output drivers may be used in other embodiments.

In this embodiment, the process includes steps 400 through 404. The FIG. 4 process is assumed to be performed by the MPIO management station 116 utilizing the access authorization management logic 120. As noted above, the MPIO management station 116 may comprise a management appliance (e.g., a PPMA) configured to manage MPIO drivers 112 of the host devices 102 providing respective production hosts for a given piece of software (e.g., the MPIO drivers 112 themselves, features thereof such as path selection logic 114, etc.) in an enterprise system. The FIG. 4 process begins with step 400, receiving, from a given MPIO driver (e.g., MPIO driver 112-1) of a given one of the production hosts 102 (e.g., host device 102-1) that utilizes a given piece of software (e.g., the MPIO driver 112-1 or portions thereof such as path selection logic 114) for controlling delivery of IO operations to the storage array 105 over selected ones of a plurality of paths through the SAN 104, an access authorization check request for the given piece of software in response to expiration of a designated access authorization refresh interval. Authorization to access software code of the given piece of software is provided by an access authorization server (e.g., access authorization server 122) external to the production hosts 102.

In step 402, an access authorization status of the MPIO driver 112-1 is determined in response to the access authorization check request received in step 400. The access authorization status indicates whether the MPIO driver 112-1 has a given access authorization credential for the given piece of software checked-out from a pool of two or more access authorization credentials issued by the access authorization server 122 to the MPIO management station 116 for the production hosts 102. An access authorization check response is provided to the MPIO driver 112-1 in step 404. The access authorization check response comprises the access authorization status of the MPIO driver 112-1. The access authorization status specifies a remaining time on an access authorization linger period for the given access authorization credential.

The MPIO management station 116 is configured to communicate with the production hosts 102 over a private network not accessible to the access authorization server 122. The access authorization check request received in step 400 and the access authorization check response provided in step 404 may be communicated utilizing a REST API.

In some embodiments, step 402 further comprises, responsive to the MPIO driver 112-1 having the given access authorization credential for the given piece of software checked-out from the pool of two or more access authorization credentials issued by the access authorization server 122 to the MPIO management station 116 for the production hosts 102, determining whether the remaining time on the access authorization linger period for the given access authorization credential is at least a designated threshold length of time less than a length of the designated access authorization refresh interval and, responsive to determining that the remaining time on the access authorization linger period for the given access authorization credential is at least the designated threshold length of time less than the length of the designated access authorization refresh interval, refreshing the access authorization linger period for the given access authorization credential.

Step 402 may also or alternatively further comprise, responsive to the MPIO driver 112-1 not having the given access authorization credential for the given piece of software checked-out from the pool of two or more access authorization credentials issued by the access authorization server 122 to the MPIO management station 116 for the production hosts 102, determining whether there is an available access authorization credential in the pool of two or more access authorization credentials issued by the access authorization server 122 to the MPIO management station 116 for the production hosts 102. Responsive to determining that there is an available access authorization credential in the pool of two or more access authorization credentials issued by the access authorization server 122 to the MPIO management station 116 for the production hosts 102, the MPIO management station 116 may check-out the available access authorization credential and register the available access authorization credential as the given access authorization credential for the MPIO driver 112-1 of the host device 102-1. Registering the available access authorization credential as the given access authorization credential for the MPIO driver 112-1 of the host device 102-1 may comprise establishing the access authorization linger period for the given access authorization credential.

Step 402 may further or alternatively comprise, responsive to determining that there is not an available access authorization credential in the pool of two or more access authorization credentials issued by the access authorization server 122 to the MPIO management station 116 for the production hosts 102, setting the access authorization status of the MPIO driver 112-1 of the host device 102-1 as unauthorized.

The access authorization check response of step 404 may comprise an access authorization payload specifying access authorization details for the given access authorization credential. The access authorization details for the given access authorization credential may comprise a network address of the MPIO management station 116 to which one or more subsequent access authorization check requests for the given access authorization credential are to be sent following one or more subsequent expirations of the designated access authorization refresh interval.

Step 404 may include enabling use of the given piece of software by the MPIO driver 112-1 of the host device 102-1 by persisting a key of the given access authorization credential in at least one of a kernel of the host device 102-1 and a process memory of the host device 102-1.

The pool of two or more access authorization credentials may be issued for the production hosts 102 collectively, such that respective ones of the access authorization credentials in pool of two or more access authorization credentials are configured to be checked-out for use by a first MPIO driver (e.g., MPIO driver 112-1) of a first one of the production hosts 102 (e.g., host device 102-1) for a first period of time and to be checked-out for use by a second MPIO driver (e.g., MPIO driver 112-N) of a second one of the production hosts 102 (e.g., host device 102-N) for a second period of time.

The pool of two or more access authorization credentials may also be issued independent of hardware configurations of the production hosts 102, such that respective ones of the access authorization credentials in the pool of two or more access authorization credentials are configured to be checked-out for use by a first MPIO driver (e.g., MPIO driver 112-1) of a first one of the production hosts 102 (e.g., host device 102-1) with a first hardware configuration for a first period of time and to be checked-out for use by a second MPIO driver (e.g., MPIO driver 112-N) of a second one of the production hosts 102 (e.g., host device 102-N) with a second hardware configuration for a second period of time.

The pool of two or more access authorization credentials may also or alternatively be issued independent of software platform configurations of the production hosts 102, such that respective ones of the access authorization credentials in the pool of two or more access authorization credentials are configured to be checked-out for use by a first MPIO driver (e.g., MPIO driver 112-1) of a first one of the production hosts 102 (e.g., host device 102-1) with a first software platform configuration for a first period of time and to be checked-out for use by a second MPIO driver (e.g., MPIO driver 112-N) of a second one of the production hosts 102 (e.g., host device 102-N) with a second software platform configuration for a second period of time.

The MPIO management station 116 may be further configured to update the pool of two or more access authorization credentials issued by the access authorization server 122 while maintaining access authorization status of the MPIO drivers 112 of the production hosts 102 with checked-out access authorization credentials from the pool of two or more access authorization credentials.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for access authorization for software code of multi-path input-output drivers will now be described in greater detail with reference to FIGS. 5 and 6. Although described in the context of system 100, these platforms may also be used to implement at least portions of other information processing systems in other embodiments.

Figure 5:
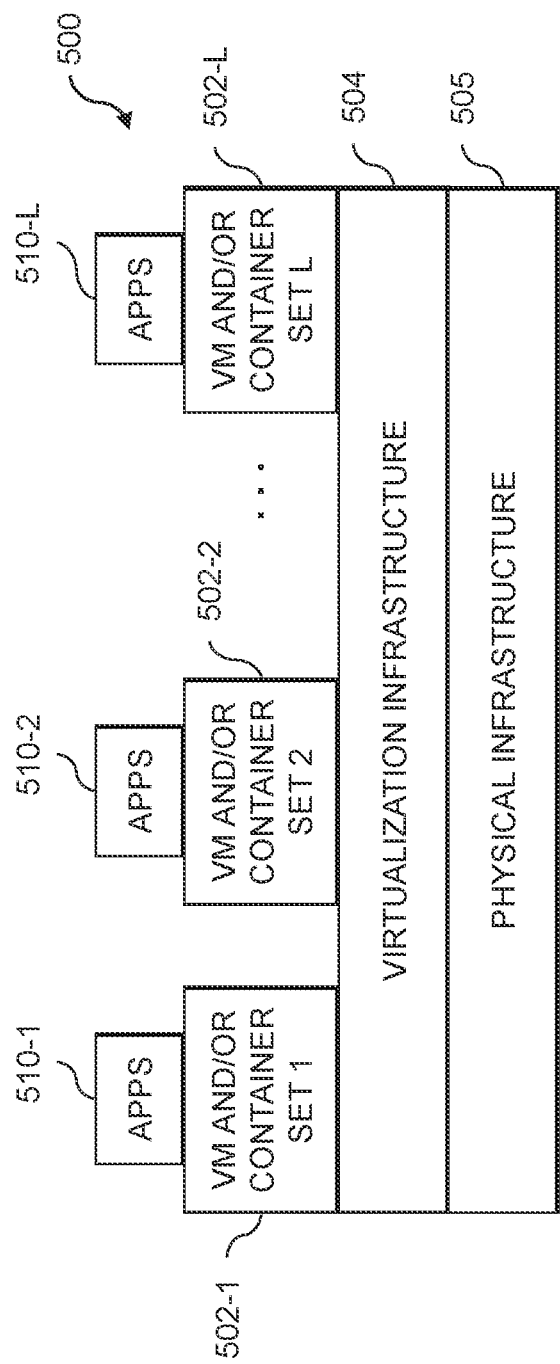
FIGS. 5 and 6 show examples of processing platforms that may be utilized to implement at least a portion of an information processing system in illustrative embodiments.
Figure 6:
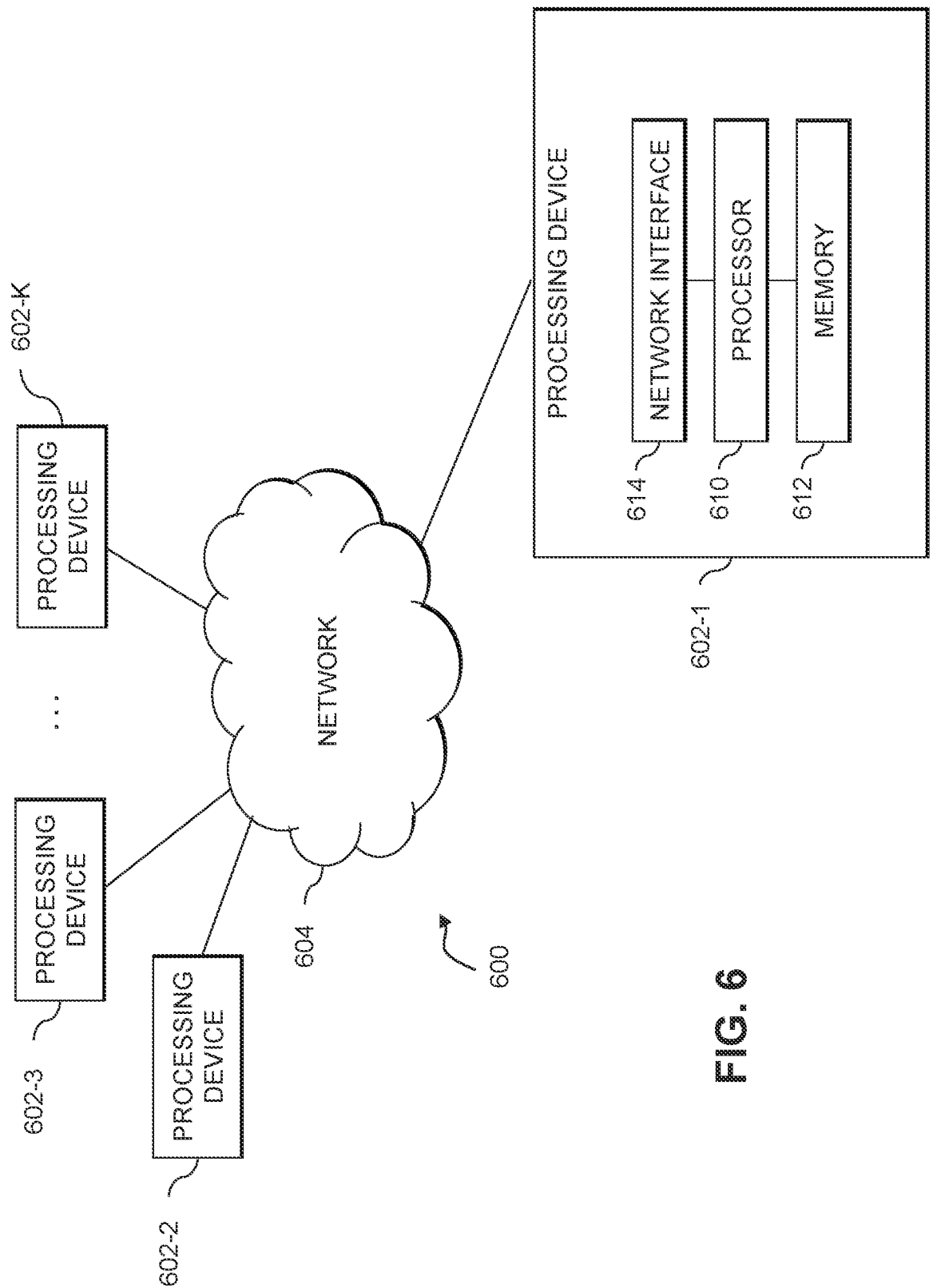

FIG. 5 shows an example processing platform comprising cloud infrastructure 500. The cloud infrastructure 500 comprises a combination of physical and virtual processing resources that may be utilized to implement at least a portion of the information processing system 100 in FIG. 1. The cloud infrastructure 500 comprises multiple virtual machines (VMs) and/or container sets 502-1, 502-2, . . . 502-L implemented using virtualization infrastructure 504. The virtualization infrastructure 504 runs on physical infrastructure 505, and illustratively comprises one or more hypervisors and/or operating system level virtualization infrastructure. The operating system level virtualization infrastructure illustratively comprises kernel control groups of a Linux operating system or other type of operating system.

The cloud infrastructure 500 further comprises sets of applications 510-1, 510-2, . . . 510-L running on respective ones of the VMs/container sets 502-1, 502-2, . . . 502-L under the control of the virtualization infrastructure 504. The VMs/container sets 502 may comprise respective VMs, respective sets of one or more containers, or respective sets of one or more containers running in VMs.

In some implementations of the FIG. 5 embodiment, the VMs/container sets 502 comprise respective VMs implemented using virtualization infrastructure 504 that comprises at least one hypervisor. A hypervisor platform may be used to implement a hypervisor within the virtualization infrastructure 504, where the hypervisor platform has an associated virtual infrastructure management system. The underlying physical machines may comprise one or more distributed processing platforms that include one or more storage systems.

In other implementations of the FIG. 5 embodiment, the VMs/container sets 502 comprise respective containers implemented using virtualization infrastructure 504 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 500 shown in FIG. 5 may represent at least a portion of one processing platform. Another example of such a processing platform is processing platform 600 shown in FIG. 6.

The processing platform 600 in this embodiment comprises a portion of system 100 and includes a plurality of processing devices, denoted 602-1, 602-2, 602-3, . . . 602-K, which communicate with one another over a network 604.

The network 604 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 602-1 in the processing platform 600 comprises a processor 610 coupled to a memory 612.

The processor 610 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 612 may comprise random access memory (RAM), read-only memory (ROM), flash memory or other types of memory, in any combination. The memory 612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 602-1 is network interface circuitry 614, which is used to interface the processing device with the network 604 and other system components, and may comprise conventional transceivers.

The other processing devices 602 of the processing platform 600 are assumed to be configured in a manner similar to that shown for processing device 602-1 in the figure.

Again, the particular processing platform 600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for access authorization for software code of multi-path input-output drivers as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, access authorization models, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
    at least one processing device comprising a processor coupled to a memory;
    the at least one processing device being configured to perform steps of:
        receiving, from a given multi-path input-output driver of a given one of a plurality of host devices that utilizes a given piece of software for controlling delivery of input-output operations to a storage system over selected ones of a plurality of paths through a network, an access authorization check request for the given piece of software in response to expiration of a designated access authorization refresh interval, wherein authorization to access software code of the given piece of software is provided by an access authorization server external to the plurality of host devices;
        determining, in response to the access authorization check request, an access authorization status of the given multi-path input-output driver, the access authorization status indicating whether the given multi-path input-output driver has a given access authorization credential for the given piece of software checked-out from a pool of two or more access authorization credentials issued by the access authorization server for the plurality of host devices; and
        providing, to the given multi-path input-output driver, an access authorization check response comprising the access authorization status of the given multi-path input-output driver, the access authorization status specifying a remaining time on an access authorization linger period for the given access authorization credential.

2. The apparatus of claim 1 wherein the at least one processing device is configured to communicate with the plurality of host devices over a private network not accessible to the access authorization server.

3. The apparatus of claim 1 wherein the access authorization check request and the access authorization check response are communicated utilizing a representational state transfer application programming interface.

4. The apparatus of claim 1 wherein the at least one processing device is further configured to perform the steps of:
responsive to the given multi-path input-output driver having the given access authorization credential for the given piece of software checked-out from the pool of two or more access authorization credentials issued by the access authorization server for the plurality of host devices, determining whether the remaining time on the access authorization linger period for the given access authorization credential is at least a designated threshold length of time less than a length of the designated access authorization refresh interval; and
responsive to determining that the remaining time on the access authorization linger period for the given access authorization credential is at least the designated threshold length of time less than the length of the designated access authorization refresh interval, refreshing the access authorization linger period for the given access authorization credential.

5. The apparatus of claim 1 wherein the at least one processing device is further configured to perform the step of, responsive to the given multi-path input-output driver not having the given access authorization credential for the given piece of software checked-out from the pool of two or more access authorization credentials issued by the access authorization server for the plurality of host devices, determining whether there is an available access authorization credential in the pool of two or more access authorization credentials issued by the access authorization server for the plurality of host devices.

6. The apparatus of claim 5 wherein the at least one processing device is further configured to perform the step of, responsive to determining that there is an available access authorization credential in the pool of two or more access authorization credentials issued by the access authorization server for the plurality of host devices, checking-out the available access authorization credential and registering the available access authorization credential as the given access authorization credential for the given multi-path input-output driver of the given host device, wherein registering the available access authorization credential as the given access authorization credential for the given multi-path input-output driver of the given host device comprises establishing the access authorization linger period for the given access authorization credential.

7. The apparatus of claim 5 wherein the at least one processing device is further configured to perform the step of, responsive to determining that there is not an available access authorization credential in the pool of two or more access authorization credentials issued by the access authorization server for the plurality of host devices, setting the access authorization status of the given multi-path input-output driver of the given host device as unauthorized.

8. The apparatus of claim 1 wherein the access authorization check response comprises an access authorization payload specifying access authorization details for the given access authorization credential, the access authorization details for the given access authorization credential comprising a network address of the at least one processing device to which one or more subsequent access authorization check requests for the given access authorization credential are to be sent following one or more subsequent expirations of the designated access authorization refresh interval.

9. The apparatus of claim 1 wherein providing the access authorization check response further comprises enabling use of the given piece of software by the given multi-path input-output driver of the given host device by persisting a key of the given access authorization credential in at least one of a kernel of the given host device and a process memory of the given host device.

10. The apparatus of claim 1 wherein the at least one processing device comprises a management appliance configured to manage multi-path input-output drivers of the plurality of host devices providing respective production hosts for the given piece of software in an enterprise system.

11. The apparatus of claim 1 wherein the pool of two or more access authorization credentials is issued for the plurality of host devices collectively, such that respective ones of the access authorization credentials in the pool of two or more access authorization credentials are configured to be checked-out for use by a first multi-path input-output driver of a first one of the plurality of host devices for a first period of time and to be checked-out for use by a second multi-path input-output driver of a second one of the plurality of host devices for a second period of time.

12. The apparatus of claim 1 wherein the pool of two or more access authorization credentials is issued independent of hardware configurations of the plurality of host devices, such that respective ones of the access authorization credentials in the pool of two or more access authorization credentials are configured to be checked-out for use by a first multi-path input-output driver of a first one of the plurality of host devices with a first hardware configuration for a first period of time and to be checked-out for use by a second multi-path input-output driver of a second one of the plurality of host devices with a second hardware configuration for a second period of time.

13. The apparatus of claim 1 wherein the pool of two or more access authorization credentials is issued independent of software platform configurations of the plurality of host devices, such that respective ones of the access authorization credentials in the pool of two or more access authorization credentials are configured to be checked-out for use by a first multi-path input-output driver of a first one of the plurality of host devices with a first software platform configuration for a first period of time and to be checked-out for use by a second multi-path input-output driver of a second one of plurality of host devices with a second software platform configuration for a second period of time.

14. The apparatus of claim 1 wherein the at least one processing device is further configured to perform the step of updating the pool of two or more access authorization credentials issued by the access authorization server while maintaining access authorization status of multi-path input-output drivers of ones of the plurality of host devices with checked-out access authorization credentials from the pool of two or more access authorization credentials.

15. A method comprising:
receiving, from a given multi-path input-output driver of a given one of a plurality of host devices that utilizes a given piece of software for controlling delivery of input-output operations to a storage system over selected ones of a plurality of paths through a network, an access authorization check request for the given piece of software in response to expiration of a designated access authorization refresh interval, wherein authorization to access software code of the given piece of software is provided by an access authorization server external to the plurality of host devices;
determining, in response to the access authorization check request, an access authorization status of the given multi-path input-output driver, the access authorization status indicating whether the given multi-path input-output driver has a given access authorization credential for the given piece of software checked-out from a pool of two or more access authorization credentials issued by the access authorization server for the plurality of host devices; and providing, to the given multi-path input-output driver, an access authorization check response comprising the access authorization status of the given multi-path input-output driver, the access authorization status specifying a remaining time on an access authorization linger period for the given access authorization credential;

wherein the method is performed by at least one processing device comprising a processor coupled to a memory.

16. The method of claim 15 wherein the access authorization check request and the access authorization check response are communicated utilizing a representational state transfer application programming interface.

17. The method of claim 15 further comprising:

responsive to the given multi-path input-output driver having the given access authorization credential for the given piece of software checked-out from the pool of two or more access authorization credentials issued by the access authorization server for the plurality of host devices, determining whether the remaining time on the access authorization linger period for the given access authorization credential is at least a designated threshold length of time less than a length of the designated access authorization refresh interval; and responsive to determining that the remaining time on the access authorization linger period for the given access authorization credential is at least the designated threshold length of time less than the length of the designated access authorization refresh interval, refreshing the access authorization linger period for the given access authorization credential.

18. A computer program product comprising a non-transitory processor-readable storage medium having stored therein program code of one or more software programs, wherein the program code when executed by at least one processing device causes the at least one processing device to perform steps of:

receiving, from a given multi-path input-output driver of a given one of a plurality of host devices that utilizes a given piece of software for controlling delivery of input-output operations to a storage system over selected ones of a plurality of paths through a network, an access authorization check request for the given piece of software in response to expiration of a designated access authorization refresh interval, wherein authorization to access software code of the given piece of software is provided by an access authorization server external to the plurality of host devices;

determining, in response to the access authorization check request, an access authorization status of the given multi-path input-output driver, the access authorization status indicating whether the given multi-path input-output driver has a given access authorization credential for the given piece of software checked-out from a pool of two or more access authorization credentials issued by the access authorization server for the plurality of host devices; and providing, to the given multi-path input-output driver, an access authorization check response comprising the access authorization status of the given multi-path input-output driver, the access authorization status specifying a remaining time on an access authorization linger period for the given access authorization credential.

19. The computer program product of claim 18 wherein the access authorization check request and the access authorization check response are communicated utilizing a representational state transfer application programming interface.

20. The computer program product of claim 18 wherein the program code when executed by the first host device further causes the multi-path input-output management station to perform steps of:

responsive to the given multi-path input-output driver having the given access authorization credential for the given piece of software checked-out from the pool of two or more access authorization credentials issued by the access authorization server for the plurality of host devices, determining whether the remaining time on the access authorization linger period for the given access authorization credential is at least a designated threshold length of time less than a length of the designated access authorization refresh interval; and responsive to determining that the remaining time on the access authorization linger period for the given access authorization credential is at least the designated threshold length of time less than the length of the designated access authorization refresh interval, refreshing the access authorization linger period for the given access authorization credential.

* * * * *